United States Patent
Tuzhilin et al.

(10) Patent No.: US 8,572,020 B2
(45) Date of Patent: Oct. 29, 2013

(54) SYSTEM, PROCESS AND SOFTWARE ARRANGEMENT FOR PROVIDING MULTIDIMENSIONAL RECOMMENDATIONS/SUGGESTIONS

(75) Inventors: Alexander Tuzhilin, New York, NY (US); Gediminas Adomavicius, Minneapolis, MN (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/593,296

(22) Filed: Aug. 23, 2012

(65) Prior Publication Data

US 2012/0317070 A1    Dec. 13, 2012

Related U.S. Application Data

(63) Continuation of application No. 13/476,892, filed on May 21, 2012, which is a continuation of application No. 10/468,509, filed as application No. PCT/US02/04127 on Feb. 12, 2002, now Pat. No. 8,185,487.

(60) Provisional application No. 60/268,108, filed on Feb. 12, 2001.

(51) Int. Cl.
    *G06F 7/00* (2006.01)
(52) U.S. Cl.
    USPC ........................... 707/600; 707/607; 705/26.7
(58) Field of Classification Search
    USPC ................................. 705/26.7; 707/600, 607
    See application file for complete search history.

(56) References Cited

U.S. PATENT DOCUMENTS

| | | | | |
|---|---|---|---|---|
| 5,974,408 A | * | 10/1999 | Cohen et al. | 1/1 |
| 5,978,800 A | * | 11/1999 | Yokoyama et al. | 1/1 |
| 5,983,216 A | * | 11/1999 | Kirsch et al. | 1/1 |
| 6,236,978 B1 | * | 5/2001 | Tuzhilin | 705/7.29 |
| 6,473,750 B1 | * | 10/2002 | Petculescu et al. | 707/600 |
| 6,473,851 B1 | * | 10/2002 | Plutowski | 713/1 |
| 6,871,186 B1 | * | 3/2005 | Tuzhilin et al. | 705/26.7 |
| 6,993,532 B1 | * | 1/2006 | Platt et al. | 707/736 |
| 2002/0103692 A1 | * | 8/2002 | Rosenberg et al. | 705/10 |
| 2002/0161664 A1 | * | 10/2002 | Shaya et al. | 705/26 |
| 2006/0020614 A1 | * | 1/2006 | Kolawa et al. | 707/100 |

OTHER PUBLICATIONS

Adomavicius, G. and A. Tuzhilin. Multidimensional Recommender Systems: A Data Warehousing Approach. L. Fiege, G. Mühl, and U. Wilhelm (Eds.), Electronic Commerce: Second International Workshop, WELCOM 2001, Lecture Notes in Computer Science, vol. 2232, pp. 180-192, Springer-Verlag, 2001.*

(Continued)

*Primary Examiner* — Cheyne D Ly
(74) *Attorney, Agent, or Firm* — Baker Botts L.L.P.

(57) ABSTRACT

A process, system and computer software are provided to facilitate at least one recommendation to one or more users and/or one or more applications using multidimensional data. In particular, a multidimensional space is defined, wherein each dimension is capable of providing variable information. At least one dimension corresponds to user profiles. The multidimensional space is filled with multidimensional data corresponding to dimensions of the multidimensional space. Then, information from the multidimensional space is retrieved. Further, the recommendation is generated based on the retrieved information. In addition, it is possible to generate a recommendation-specific query. This can be performed by generating the recommendation-specific query to access a multidimensional cube and retrieve data stored therein. Then, the recommendation can be issued based on the data retrieved from the multidimensional cube.

20 Claims, 12 Drawing Sheets

(56) References Cited

OTHER PUBLICATIONS

Adomavicius et al., Data Mining and Knowledge Discovery, 5, 33-58, 2001.*

Adomavicius, G. and A. Tuzhilin. Extending Recommender Systems: A Multidimensional Approach. IJCAI-01 Workshop on Intelligent Techniques for Web Personalization (ITWP'2001), Seattle, Washington, Aug. 2001.*

* cited by examiner

SYSTEM, PROCESS AND SOFTWARE ARRANGEMENT FOR PROVIDING MULTIDIMENSIONAL RECOMMENDATIONS/SUGGESTIONS

CROSS-REFERENCE TO A RELATED APPLICATION

This application is a continuation of U.S. patent application Ser. No. 13/476,892, titled "System, Process and Software Arrangement for Providing Multidimensional Recommendation/Suggestions," filed on May 21, 2012, which is a continuation of U.S. patent application Ser. No. 10/468,509, issued as U.S. Pat. No. 8,185,487, and filed on Aug. 16, 2003 as the U.S. national stage application of PCT Appln. No. PCT/US02/04127, filed on Feb. 12, 2002 and published on Aug. 22, 2002 as International Publication No. WO 02/065327, which claims priority from U.S. patent application Ser. No. 60/268,108 filed on Feb. 12, 2001.

FIELD OF THE INVENTION

The present invention relates to a system, process and software arrangement for providing multidimensional recommendations/suggestions, and more particularly to utilizing multiple dimensions, along with comprehensive profiling and hierarchical aggregation in a recommendation model.

BACKGROUND INFORMATION

Recommendation systems have recently become important components of numerous computer applications, e.g., in the e-commerce space. In particular, such systems enable a receipt of feedback from company's customers. Based on their customer's feedback, the companies can better serve their customers by providing recommendations and suggestion thereto. Because the customers generally appreciate receiving informative and pertinent recommendations and suggestions from the companies that they deal with, such interaction between the customers and companies allow these companies which utilize the recommendation systems to establish and further develop long-lasting personalized relationships with their customers.

Research and development of systems and processes which provide recommendations and suggestions to users on a personal basis (e.g., via e-mail, the Web and mobile communication devices) has been significant in the past. Primarily, however, large portion of such research and development has concentrated on simple recommendations of items to the users or vice versa. For example, a conventional recommendation system and process may provide a particular recommendation of a certain brand of a plasma television to a user based on the user's previous transactions and/or entries of preferences. Also, the users who have previously shown interest in the plasma televisions can be forwarded to a particular brand of the plasma television based on the characteristics of such television. Other exemplary applications of the conventional systems and processes provide, e.g., movies to site visitors (and vise versa), book customers to books (or vice versa), etc. These conventional recommendation systems and processes are usually based on known two-dimensional collaborative filtering techniques, content based filtering techniques or a combination of both.

Exemplary collaborative filtering techniques are described in J. S. Breese et al., "Empherical Analysis of Predictive Algorithms for Collaborative Filtering," Technical Report MSR-TR-98-12, Microsoft Research, May 1998; W. Hill et al., "Recommending and Evaluating Choices in a Virtual Community of Use," Proceedings of CHI-95 Conference, Denver, Colo., 1995, pp. 194-201, and U. Shardanand et al., "Social Information Filtering: Algorithms for Automating 'Word of Mouth'," Proceedings of the Conference on Human Factors in Computing Systems (CHI'95), ACM Press, 1995, pp. 210-217. Content-based filtering techniques are described in the Breese publication, F. R. J. Mooney et al, "Book Recommending using Text Categorization with Extracted Information," Recommender Systems, Papers from 1998 Workshop, Tech. Report WS-98-08, AAAI Press, 1998, and M. Pazzani et al., "Syskill & Webert: Identifying Interesting Web Sites," Proceedings of the National Conference on Artificial Intelligence, 1996. Techniques that combine the corroborative filtering and content-based techniques are described in A. Ansari et al., "Internet Recommendations Systems," Journal of Marketing Research, August 2000, pp. 363-375, M. Balabanovic et al., "Fab: Content-based, Collaborative Recommendation," Communications of the ACM, 40(3):66-72, 1997, and M. Pazzani et al., "A Framework for Collaborative, Content-based and Demographic Filtering," Artificial Intelligence Review, December 1999, pp. 393-408. However, in numerous applications, e.g., recommending vacation packages, restaurants or Web content to customers, it may not be sufficient to recommend particular items to certain users or to suggest the users to the particular items.

For example, certain customer's preferences for vacation packages may be dependent on the current time of the year or the time of the year that the vacation package is being offered. This is because such customer may prefer to vacation in the Caribbean in the winter, but not in the summer, or that the Caribbean vacation is only being offered at a low rate in the summer. In addition, for certain applications and situations, it may not be beneficial or appropriate to recommend individual items to individual users, but instead provide certain categories of items to particular types of users. One example of such recommendation facilitation may be providing movies which fit into a category of action movies to college students. Moreover, while some of the existing recommendation systems support limited profiles of the users and items, it is preferable to utilize more extensive profiling capabilities such as the ones described in G. Adomavicius et al., "Expert-driven Validation of Rule-based User Models in Personalization Applications," Data Mining and Knowledge Discovery, 5(1/2):33-58, 2001.

The traditional two-dimensional recommendation systems and processes also provide the recommendations of at most two types by e.g., providing top N items to the user or top M users to the item. Further, these types of recommendations are typically pre-fixed into the recommendation software system by a company providing the software system, without being able to dynamically change the predefined recommendation types. However, in many multi-dimensional applications, it is exactly what would be necessary to be able to provide more extensive and flexible types of recommendations to be requested by the user. For example, it may be preferable to recommend top three action movies that are not longer than 2 hours to individual users, and to limit providing such movie recommendations to only those users whose favorite movie type list includes action movies.

OBJECTS AND SUMMARY OF THE INVENTION

Therefore, it is one of the objects of the present invention to provide an ability to support and utilize multiple dimensions for generating recommendations and suggestions, such the multiple dimension can include users, items, time, place, etc. Another object of the present invention is to support aggregation hierarchies for various dimensions, and provide recommendation capabilities at different levels of aggregation. Yet another object of the present invention is to support extensive profiling capabilities in multi-dimensional recommendation systems and processes.

In order to provide the above-described recommendation capabilities, a recommendation query language ("RQL") can be provided to allow the users to obtain complex and flexible recommendations that may take into consideration multiple dimensions, aggregation hierarchies, and extensive profiling. The proposed approach can be based on, e.g., a data warehouse paradigm as described in S. Chaudhuri et al., "An Overview of Data Warehousing and OLAP Technology," ACM SIGMOD Record, 26(1):65-74, 1997, and R. Kimball, "The Data Warehouse Toolkit," John Wiley & Sons, Inc., 1996.

Still another object of the present invention is to combine the above-described features of the present invention as components of an integrated multi-dimensional recommendation model based on the data warehouse paradigm. Such integrated model supports multiple dimensions, and the hierarchies of the data warehouse facilitate certain recommendation capabilities at multiple aggregation levels (e.g., On-Line Analytical Processing—"OLAP"—enabled data warehousing systems).

Yet another object of the present invention is to provide a language for the user(s) to express complex and extensive recommendations in a flexible manner.

Various embodiments of a process and system according to the present invention overcome the above-described deficiencies of the conventional recommendation systems and processes.

In particular, a process, system and software arrangement according to the present invention are provided to provide multi-dimensional recommendations. A process, system and computer software are provided to facilitate at least one recommendation to one or more users and/or one or more applications using multidimensional data. In particular, the multidimensional data defining a multidimensional space is accessed. The multidimensional space can consist of more than two dimensions (unlike the current recommendation systems that can handle only two dimensions), each capable of providing variable information. Then, information from the multidimensional space is retrieved. Further, the recommendation is generated based on the retrieved information.

In one exemplary embodiment of the present invention, the recommendation includes multidimensional suggestions, which can be based on multiple factors associated with the at least one of the users and the applications. In addition, the retrieved information can include manually-entered ratings previously generated by the users and/or the applications for goods, services and/or information. The recommendation may provide further data which relates to the goods, the services and/or the particular information.

The manually-entered ratings can be provided by the one or more users. In addition, prior to the information being retrieved, the multidimensional space can be filled with the manually-entered ratings. After the multidimensional space is filled and if the multidimensional space is not substantially or fully filled with the manually-entered ratings, estimated ratings can automatically be generated based on the manually-entered ratings. Further, after automatically generating the estimated ratings, it is possible to fill at least one unfilled portion of the multidimensional space with the automatically-generated ratings. The automatically-generated ratings may relate to the goods, the services and/or the particular information, and the multidimensional space can represent a set of all ratings for all possible goods, services and/or information.

In still another embodiment of the present invention, at least one of the dimensions may have a hierarchy or profiles. The profiles may have static characteristics, and can include factual information consisting of certain facts regarding the respective dimension. Each of the static profiles can be recorded in a data storage arrangement as one record per each dimension. The profiles may also have dynamic characteristics, which can include at least one set of rules. The dynamic profiles may also contain include at least one set of sequences.

According to yet another embodiment of the present invention, the recommendation can be provided to the users and/or applications for a particular category of the goods, services and/or particular information. At least one of the dimensions may have a hierarchy associated with its elements, the retrieved information can include manually-entered ratings, and if the multidimensional space is not filled with the manually-entered ratings, aggregate ratings can be calculated based on the hierarchy.

In a further embodiment of the present invention, prior to the recommendation being generated, a recommendation technique can be dynamically-selected from a set of techniques to generate the recommendation. Also, the recommendation can be generated by issuing a recommendation request-type query which is translatable into a Structured Query Language ("SQL") query. Further, the multidimensional space may be represented as a multidimensional cube which stores the information to be retrieved therein.

In addition, according to yet another embodiment of the present invention, it is possible to generate a recommendation-specific query. This can be performed by accessing a multidimensional cube which stores data therein, and then generating such recommendation-specific query to obtain at least one recommendation from the multidimensional cube based on the data thereof. The recommendation-specific query is preferably translatable into the SQL query.

Unless otherwise defined, all technical and scientific terms used herein have the same, or substantially similar, meaning as commonly understood by one of ordinary skill in the art to which the present invention belongs. Although processes, systems and software arrangements similar or equivalent to those described herein can be used in the practice or testing of the present invention, exemplary processes, systems and software arrangements are described below in further detail. In addition, the systems, processes, software arrangements and examples are provided for the purposes of illustration only, and are in no way limiting. All cited references are incorporated herein by reference.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION

I. High-Level Diagrams of an Exemplary System

Figure 1:
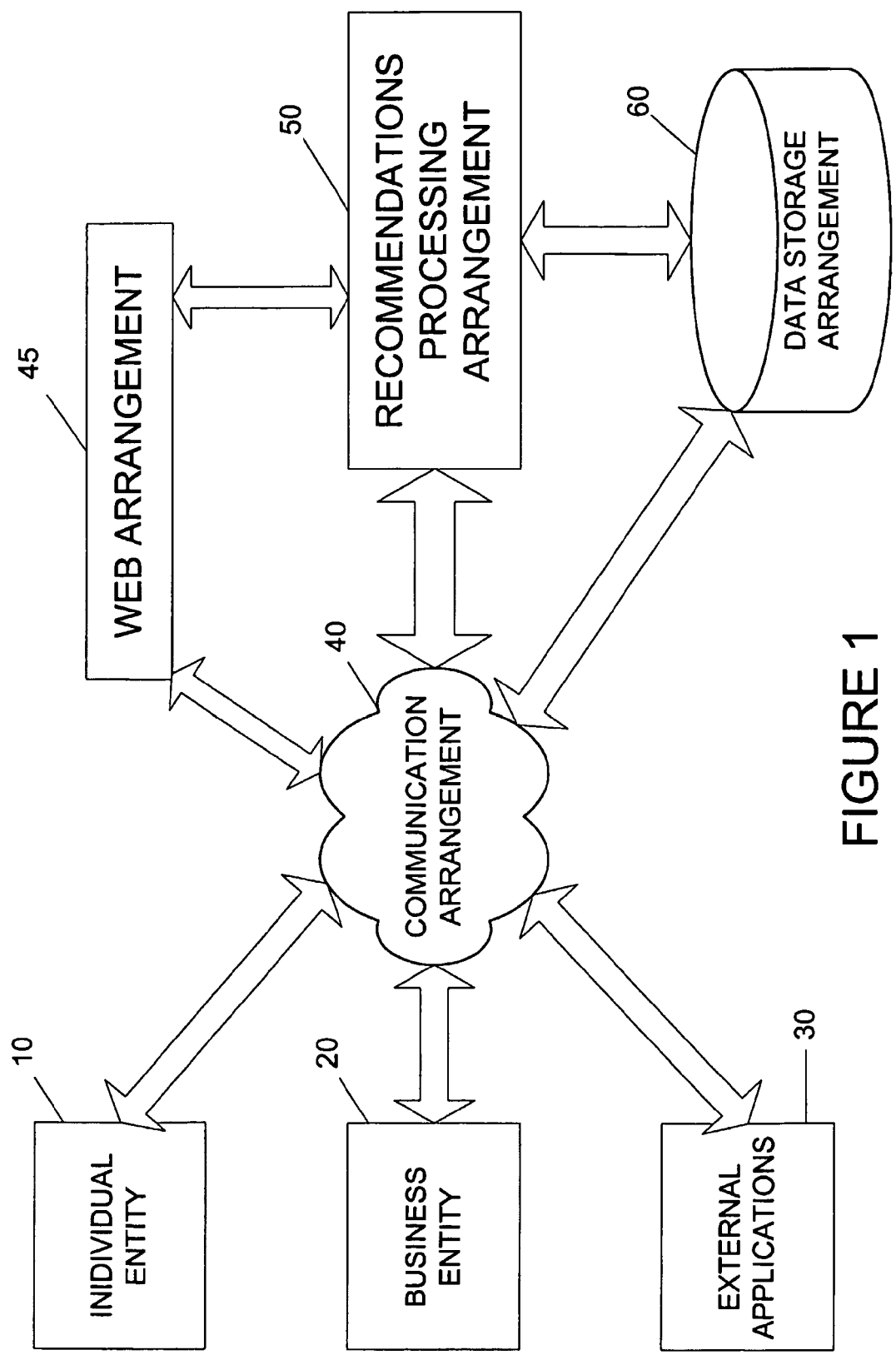
FIG. 1 is an exemplary embodiment of a multidimensional system according to the present invention which includes a processing arrangement capable of providing multi-dimensional recommendations aggregations and profile capabilities hierarchical.

FIG. 1 illustrates an exemplary embodiment of a multidimensional system according to the present invention which includes a processing arrangement capable of providing multi-dimensional recommendations, as shall be described in further detail below. In particular, the system includes a processing arrangement 50 which can be a mini-computer, a micro-computer, a mainframe, etc. A web arrangement 45 (e.g., a personal computer, a mini computer, a mainframe or a combination/plurality of each) may be connected to the processing arrangement 50 so as to request recommendations and/or suggestions therefrom web arrangement's user based on the data provided by the web arrangement 45 to the processing arrangement. In addition, the processing arrangement 50 can be used for providing hierarchical aggregation and extensive profiling capabilities, as shall be described in further detail below. Multiple entities are connected to the web arrangement 45 directly and/or via a communication arrangement 40 (e.g., the Internet, intranet, extranet, local area network, wide area network, etc.), so that the web arrangement 45 can preferably provide information, products and/or services to such entities when they access the web arrangement 45. It should be understood that the processing arrangement 50 does not have to be connected to the communication arrangement 40 or to any other network, and can be a stand alone system. Indeed, the use of the communication arrangement 40 and the web arrangement 45 as shall be described herein below is only provided for explanatory purposes only, and is not restrictive or limiting on the processing arrangement and process according to the present invention.

The information, products and/or services may include shopping tips and information, movie suggestions, items to be purchased, etc. Thus, when the entities access the web arrangement 45, they may request (and the web arrangement 45 can provide) the information, products and/or services. In addition, the web arrangement 45 may forward recommendation and/or suggestions for the products and/or services (or the categories thereof) that the web arrangement 45 may have obtained for the entities from other sources. As indicated above, the web arrangement 45 may be connected to a processing arrangement (e.g., a personal computer, a mini computer, a mainframe or a combination/plurality of each), either via directly or via the communication network 40. The processing arrangement 50 is preferably the device which generates the recommendations and/or suggestions to the web arrangement 45 and/or the entities. The web arrangement 45 can provide the data received from the entities regarding the entities characteristics, profiles, ratings, etc. to the processing arrangement 50, which can be used to generate recommendations and/or suggestions for the entities and/or other users and systems. It is also within the scope of the present invention to provide the data to the processing arrangement 50 from sources other than (or in addition to) those described herein. Indeed, the recommendation generation of the processing arrangement 50 does not depend the source of the data. After these recommendations/suggestions are received by the web arrangement 45 from the processing arrangement 50, they can preferably be transmitted by the web arrangement 45 to the entities or other users/systems. Alternatively or in addition, the processing arrangement 50 can forward the recommendations/suggestions directly to the entities or other users/systems upon the generation of the recommendations/suggestions by the processing arrangement 50.

The entities may be individuals 10 and business entities 20 connecting to the web arrangement 45, the processing arrangement 50 and/or the communication arrangement 40 through their respective computing and communications devices. In addition, external application 30 may be able to gain access to the web arrangement 45 and/or the processing arrangement 50, either directly or via the communication network 40. These entities 10, 20 and applications 30 may avail themselves to the recommendations and/or suggestions issued by the processing arrangement 50, as well as providing certain data thereto, e.g., the individual's preferences and/or ratings for a particular product, service, type of product/service or group thereof.

This processing arrangement 50 can access the data from, and provide new received and/or generated data to an internal data storage source (e.g., a CD-ROM, hard drive, etc.) or to an external data storage arrangement (e.g., data tapes, disk array, database, collection of databases, etc.), either directly or via the communication arrangement 40. Such data can preferably be recommendation data generated by the processing arrangement 50, and may also include the profiles of the individual 10, the business entity 20 and the external application 30. It should be understood that the individual 10 can be a person or a group of people receiving recommendations, as well as being the source of the profiling information. In general, they can be different. In another embodiment of the present invention, the external data storage arrangement 60 can record thereon preferences provided by the individuals 10 and/or business entities 20 regarding the types of products and/or services which interest them, as well as the information regarding the particulars of the transactions previously performed thereby. Furthermore, the processing arrangement 50 preferably accesses its internal storage device or and/or the external storage arrangement 60 to gain access to the data from a multi-dimensional data store which is recorded thereon. Using the information obtained from the multi-dimensional data store, the processing arrangement 50 can generate and forward to the web arrangement 45, the individuals 10, business entities 20 and/or external applications 30 particular recommendations which are relevant to the entities, applications and/or other users. As mentioned above, the processing arrangement 50 of the present invention is able to utilize aggregation hierarchies and extensive profiling information which can be stored on the multi-dimensional data store for generating the above-described recommendations and/or suggestions.

Figure 2:
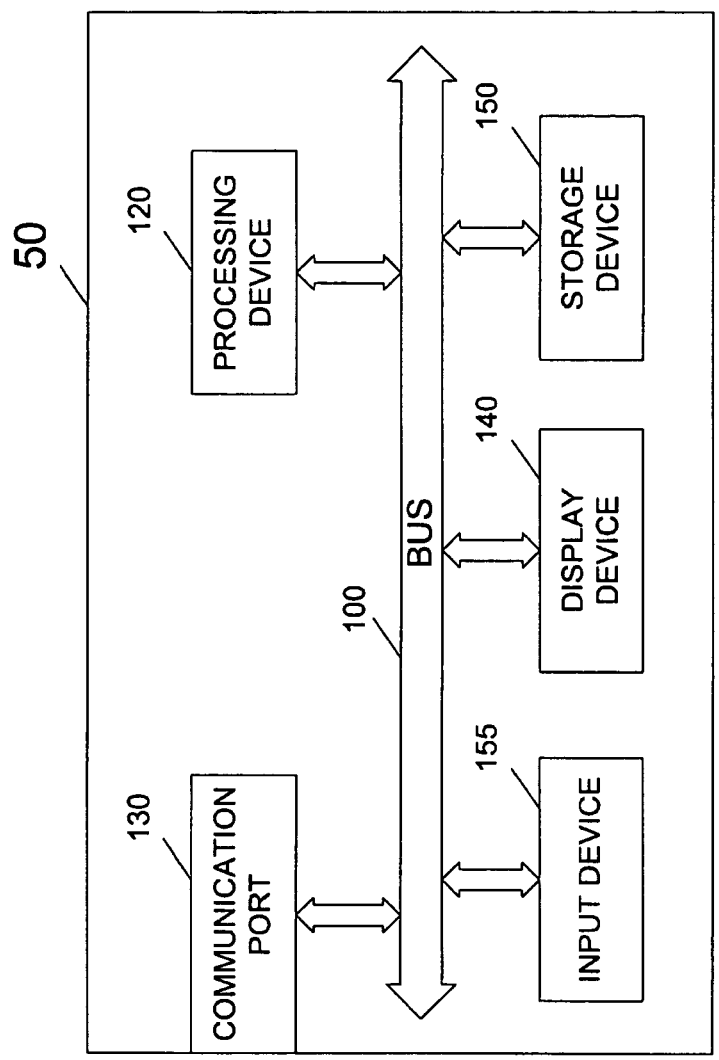
FIG. 2 is a block diagram of particular components of an exemplary embodiment of the processing arrangement shown in FIG. 1.

FIG. 2 shows a block diagram of certain components of an exemplary embodiment of the processing arrangement 50 illustrated in FIG. 1. In particular, the processing arrangement 50 preferably includes a communication port 130 which receives the data provided to the processing arrangement from the individuals 10, the business entities 20 and/or the external applications 30, which are connected to the processing arrangement 50 either directly or via the communication network 40, and which may also receive information from the external storage arrangement 60. Furthermore, the communication port 130 is configured to transmit data from the processing arrangement 50 to the individuals 10, business entities 20, external applications 30, external storage arrangement 60 and/or other devices, as well as to and from the web arrangement 45 and other systems. The communication port 130 can be an Ethernet card, as known by those having ordinary skill in the art. Of course, other communication cards can be used by the system, process and software arrangement according to the present invention. The flow of data is managed by a processing device 120 which is incorporated into the processing arrangement 50 or connected thereto. The processing device 120 can be a microprocessor, such as a Intel® Pentium®-type processor.

In operation, upon receipt of the data at the communication port 130 from the individuals 10, business entities 20, external applications 30, web arrangement 45 and/or other systems, such data can be forwarded via, e.g., a bus 100 to a display device 140 of the processing arrangement 50 to be displayed thereon, and/or to a storage device 150 of the processing arrangement 50 to be stored thereon. The display device 140 can be a monitor, a liquid crystal display, a printer and the like. The storage arrangement 150 can include read-only memory, random access memory, hard drive, floppy disk drive, compact disk, Read/Write device, etc. The processing arrangement 50 can also include an input device 155, such as a keyboard, pen-based arrangement, voice recognition system, etc. which would allow the operator of the processing arrangement 50 to enter information thereon, enter queries and/or select certain configuration and settings thereby sending a signal to the processing device 120 via the bus 100 to perform the requested procedure/query and/or to establish the entered configuration and settings for the processing arrangement 50.

Figure 3:
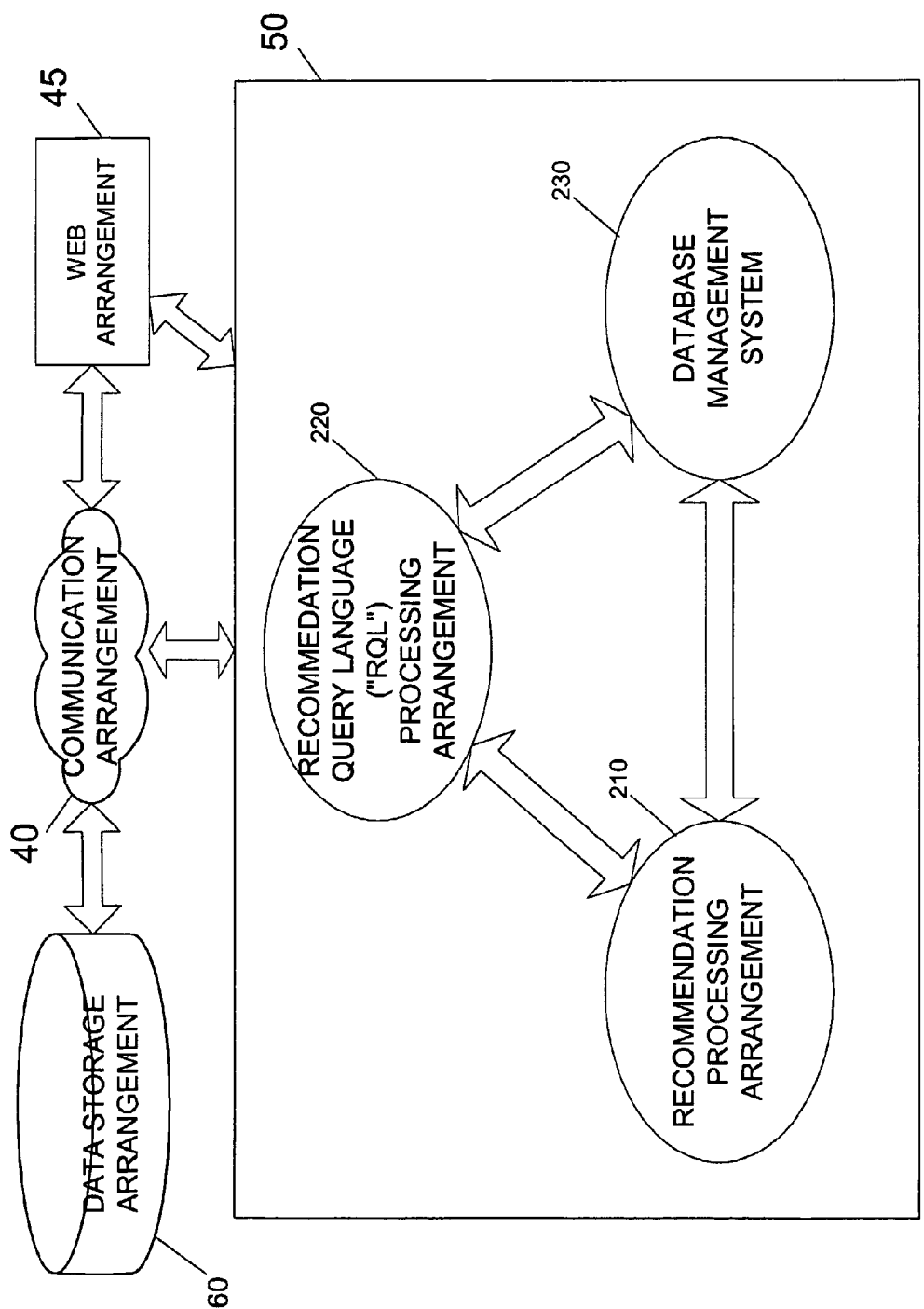
FIG. 3 is a high-level functional and architectural diagram of performance capabilities of the recommendation processing arrangement shown in FIG. 2.

FIG. 3 shows a high-level architectural block diagram of the processing arrangement 50. In particular, the processing arrangement 50 (and possibly the data storage arrangement 60) can be architecturally and functionally be sub-divided into three sections/blocks, e.g., a recommendation processing arrangement 210, a recommendation query language ("RQL") processing arrangement 220 and a database management system 230, each of which communicate with one another. According to a preferred embodiment of the present invention, the database management system 230 is a multidimensional database system as known by those having ordinary skill in the art. However, it should be understood that the database management system 230 can be of other types system, including but not limited to relational database system, etc.

In particular, the recommendation processing arrangement 210 can utilize the processing device 120 to process the data received via the communication port, the information entered using the input device 155, along with the data retrieved from the relational database management system 230 (which can store data regarding previous recommendations/suggestions and other user-related information on the storage device 150 and/or the data storage arrangement 60). In addition, the recommendation processing arrangement 210 can forward the recommendations to entities and/or web arrangement 45 as described above.

As shall be described in further detail below, the RQL processing arrangement 220 may process query requests generated by the entities 10, 20, external applications 30, web arrangement 45 systems and the like. These queries can prompt the processing device 120 of the processing arrangement 50 to access the relational database management system 230 so as to obtain ratings, previous recommendations and other information which may be relevant to the entities, applications and/or other systems issuing the query. Then, the retrieved data can be provided to the recommendation processing arrangement 210, which uses the processing device 120 to generate the recommendations and/or suggestions to the entities, applications and/or other systems, or other individuals or entities for which the recommendations/suggestions may be pertinent. As described above, these recommendations/suggestions can then be transmitted to the entities 10, 20 and/or external applications directly by the processing arrangement 50 or via the web arrangement 45, may be stored on the data storage arrangement 60 in a manner described in further details below, and/or possibly displayed on the display device 140 of the processing arrangement 50.

II. Multidimensional Recommendation Model

A. Novel Extension of Conventional Techniques

Conventional collaborative, content-based, and hybrid recommendation systems generally operate with applications which have only two types of entities, e.g., users and items, users and movies, users and Web pages, etc. It should be understood that the term "users" is not limited to people/persons/individuals, and can include computers, robots, software agents, etc. In order to provide recommendations, an initial set of ratings specifying how the users may have appreciated certain items can be explicitly specified by the users or implicitly inferred by such conventional system. The prior art recommendation systems have generally utilized ratings which were previously assigned to the items by the users to generate the recommendations. For example, when a user—John Doe—accesses a website in which he would be requested to rate a particular movie, Mr. Doe may assign a particular rating to such movie (e.g., a rating of 7 out of 13) for one or more movies (e.g., the movie "Gladiator"). Thus, a rating set for Mr. Doe can be established as $R_{movie}$ (John Doe, Gladiator)=7. Based on these initial ratings, a prior art recommendation system may attempt to make a determination of the ratings of the items which have not yet been rated by the users. This can be done by estimating the rating function R:

$$R: \text{Users} \times \text{Items} \Rightarrow \text{Ratings} \qquad (1)$$

for the {user, item} pairs which have not yet been rated. Using the conventional two-dimensional recommendation systems, the above-described rating function (1) can be implemented as a matrix that specifies the rating R(i, j) of item j by user i.

Figure 4:
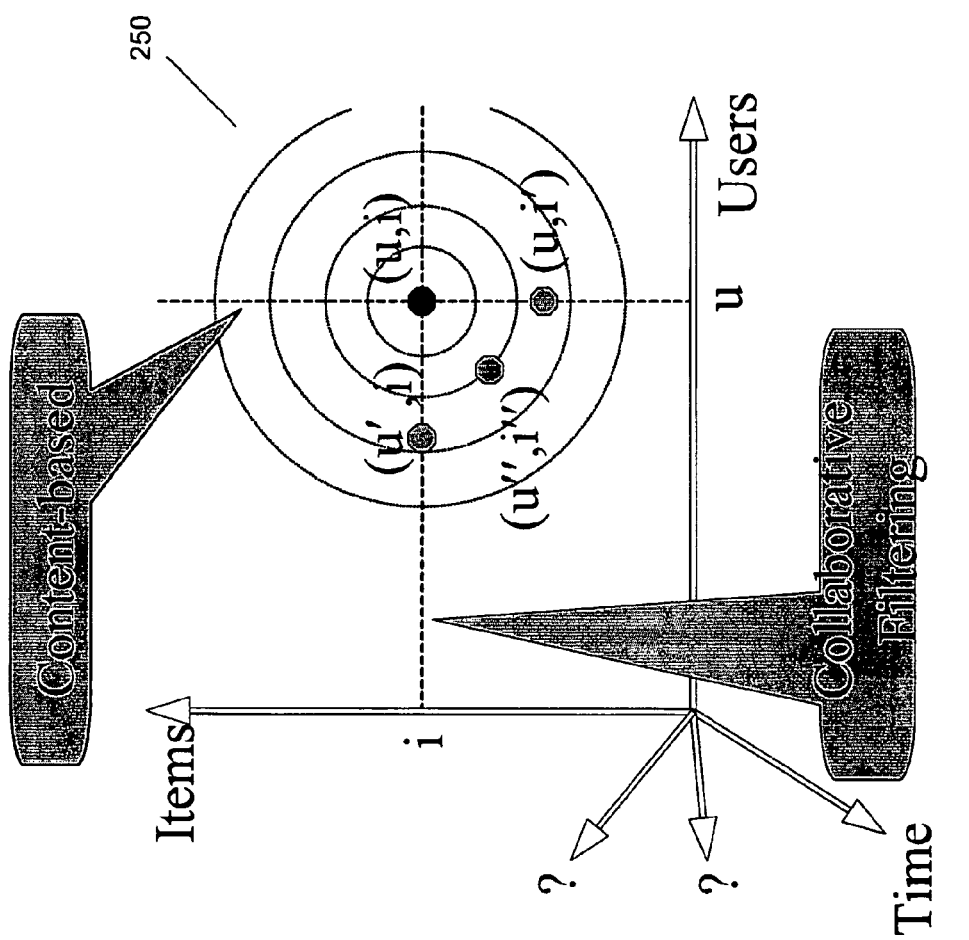
FIG. 4 is an exemplary diagram in which content-based and collaborative-filtering approaches are both used by the system and method of the present invention for providing recommendations/suggestions and to calculate/estimate ratings.

The estimation of unknown ratings can be performed using different methods, the details of which are known by those having ordinary skill in the art, and described in the publications pointed to herein above. FIG. 4 shows an exemplary diagram in which content-based, collaborative-filtering approaches, as well as a hybrid thereof are utilized by the system, process and software arrangement according to the present invention for providing recommendations and/or suggestions. In particular, when utilized for the users/items example, the collaborative technique can fill-in a ratings diagram 250 (i.e., users vs. items matrix) by estimating a rating r(u, i) which can preferably be performed by locating n users $\{u_j\}$ who are "similar" to users $\{u'\}$, and by estimating rating r(u, i) as a function $f(r(u_1, i), r(u_2, i), \ldots, r(u_n, i))$, where f can be any extrapolation function known to a person having ordinary skill in the art (e.g., an averaging function). The similarity distance between users can be computed with the techniques known to persons with ordinary skills in the art, e.g. as a correlation coefficient between two rating vectors.

When the content-based technique is utilized, the ratings matrix (users×items) can be filled by estimating rating r(u, i) which may be performed by locating n items $\{i_1, \ldots i_n\}$ which are similar to item i, such that ratings $r(u, i_k)$ exist (e.g., were manually specified by user u), and by estimating the ratings r(u, i) vector as a function $f(r(u, i_1), r(u, i_2), \ldots r(u, i_n))$. The function f can be any extrapolation function known to a person having ordinary skill in the art such as, e.g., a cosine similarity measure extensively used in information retrieval. According to the present invention, it may be preferable to estimate the ratings r(u, i) vector by:

defining the distance d between any 2 pairs of points (u, i) and (u', i') as shown by the graph 250 in FIG. 4, selecting N nearest neighbors $(u'_1, i'_1), (u'_2, i'_2), \ldots (u'_N, i'_N)$ for (u, i) with existing ratings $r(u'_i, i'_i)$ according to such distance d, and estimating rating r(u, i) as a function $f(r(u'_1, i'_1), r(u'_2, i'_2), \ldots r(u'_N, i'_N))$ of such N nearest neighbors.

Moreover, the neighbors may have weights assigned thereto (for example, based on the distance between the user and a particular neighbor) which can be used for the determination of the rating r(u, i).

In one exemplary embodiment of the above-described distance computation technique according to the present invention, a Euclidean (or weighted Euclidean) distance between the vectors can be estimated or determined. In particular, let $x=(x_1, x_2, \ldots, x_k)$ and $y=(y_1, y_2, \ldots, y_k)$ be two vectors in a k-dimensional space, and assume that each dimension i has a weight $w_i$ assigned thereto (e.g., which specifies the importance of this dimension). For example, for a 3-dimensional space having dimensions {Customer, Items, Time)}, x=(John, Harry Potter and the Sorcerer's Stone, Jan. 12 2002), i.e., John bought Harry Potter's book on Jan. 12, 2001. Thus, the distance between the two vectors x and y can be defined as $$d(X,Y) = \sqrt{\Sigma_{i=1}^{k} w_i |x_i - y_i|^2} \quad (2)$$

where $w_i$ specifies the weight or importance of the i-th dimension with the sum of weights being 1, $\Sigma_i w_i = 1$. It should be understood that other techniques than the above-described technique can be used to calculate the distance between the rating vectors which are within the scope of the present invention.

As described in further detail above, certain applications (e.g., travel recommendation and services applications, restaurant systems, and dynamic Web content presentation systems) cannot be consolidated well into the conventional two-dimensional user/item approach since they require extra dimensions, such as time, to model their inherent additional complexities. Provided below are the details of the system, process and software arrangement which utilizes multidimensional data to issue recommendations and/or suggestions.

Figure 5:
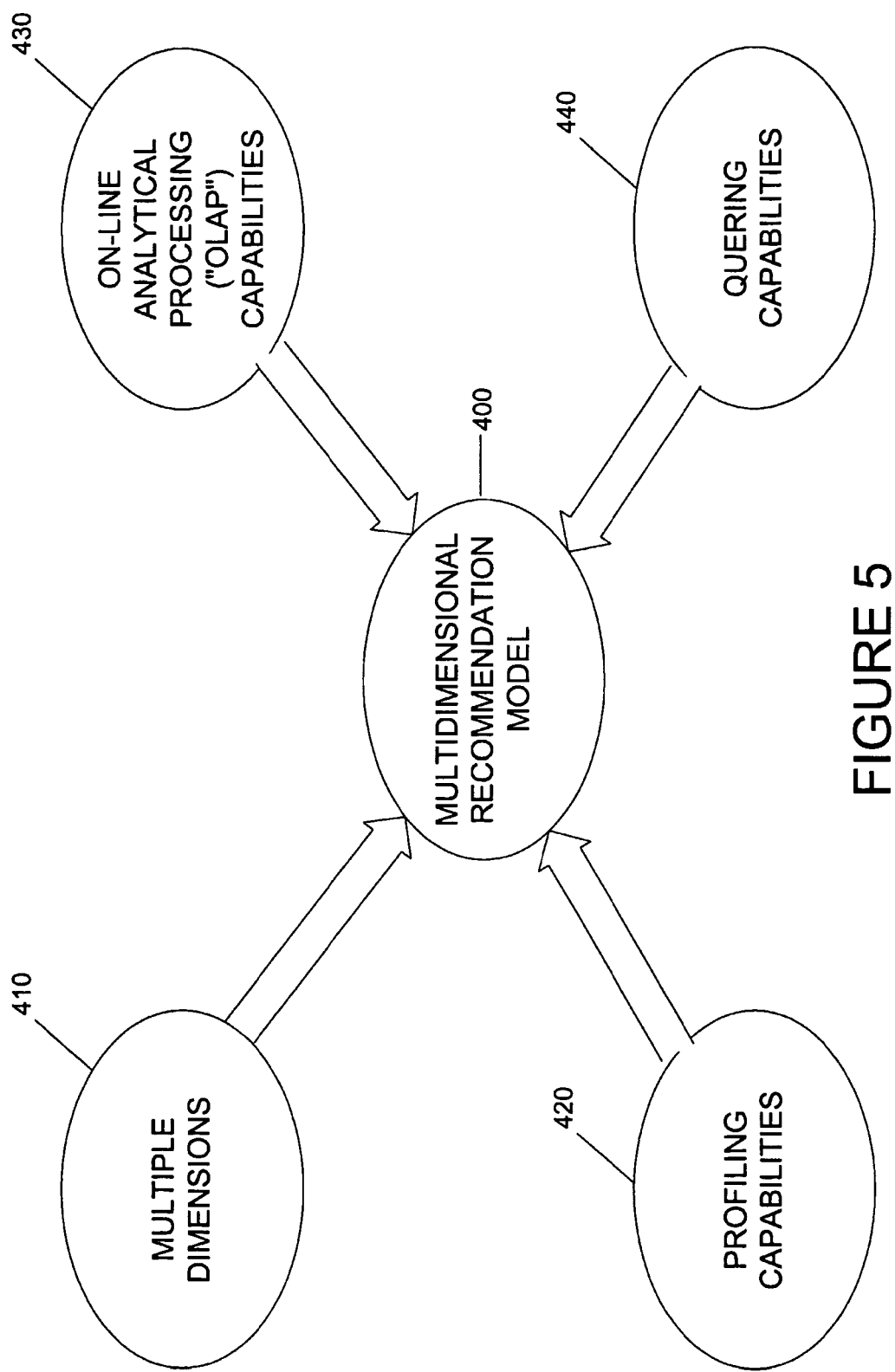
FIG. 5 is a high-level functional diagram of exemplary components of multidimensional recommendation model according to the present invention which is utilized by the processing arrangement of FIG. 2.

FIG. 5 shows a high-level functional diagram of exemplary components of multidimensional recommendation model according to the present invention which is utilized by the processing arrangement 50. In particular, the use of the multiple dimensions 410 can be integrated with the multidimensional recommendation model 400 so as to provide different and more accurate recommendations to the entities 10, 20, external application 30, web arrangement 45 and other systems. OLAP capabilities 430 can also be provided to the recommendation solution 40 to be used thereby for multidimensional purposes. Furthermore, profiling capabilities 420 and querying capabilities 440 may be incorporated into the multidimensional recommendation model 400. The details of the functional blocks describing the use of the multiple dimensions 410, the profiling capabilities 420, the OLAP capabilities 430 and the querying capabilities 440 shall be described in further details below.

B. Multiple Dimensions (Block 410)

Accordingly, the system, process and software arrangement extends the conventional two-dimensional data utilization technique to multiple dimensions of data (e.g., recommendations, ratings, users, items, date/time, location, etc.). In particular, given dimensions $D_1, D_2, \ldots, D_n$, a recommendation space can be define to be $S=D_1 \times D_2 \times \ldots \times D_n$. Ratings can be defined as a rating domain representing the set of all possible rating values. Thus, the rating function R is defined as:

$$R:S=D1 \times D2 \times \ldots \times Dn \Rightarrow \text{Ratings} \quad (3)$$

For example, in a two-dimensional space defined by the equation (1), the recommendation space can be defined as S=Users×Items. However, it is possible for the recommendation space (e.g., for a personalized web content application) to be S'=Users×Content×Time, where the user may assigns a score or rating to the content that was observed by the user at a particular time (e.g., recommending what to show to the user when he or she visit a particular website). The user—John Doe—may assign a rating of 8 to the display of the latest NBA scores on Thursday evenings, thus that particular rating can be filled into a multidimensional space defined by $R_{content}$ (John Doe, "Latest NBA scores", Thursday evening)=8. Other examples of using the space in multidimensional applications include recommending certain foods to customers in particular restaurants (e.g., S=Users×Restaurant×Food), purchasing agent applications, (e.g., recommending certain food to be bought by particular customers, which also depends on the time and place of the products and users, etc.). In the above case, the space for such multidimensional application is S=Users×Products×Time×Place (e.g., recommending to John Doe what groceries and in which stores he should make purchases this weekend).

As described above, most conventional recommendation systems provide recommendations only of one particular type, (e.g., recommend top N items to a user). However, the multidimensional recommendation system, process and software arrangement according to the present invention allows for a greater versatility and various possibilities. For example, in the personalized Web content application described above, it is possible to request to obtain the top N content items for each user/time combination, the top N times for each user/item combination, and/or the top N user/time combinations for each item. Therefore, by utilizing the multiple dimensions (e.g., more than two dimensions) of various data, it is possible to apply recommendation techniques in a much more diverse set of applications than was the case with the conventional two-dimensional recommendation systems. It will thus also be possible to obtain new types of recommendations using the multidimensional model according to the present invention.

The OLAP capabilities 430 of FIG. 5 also allow for a use of multiple dimensions (e.g., sales, profits, items sold, etc.). However, such multidimensional data stored by the system having only the traditional OLAP capabilities cannot be used to generate recommendations and/or suggestions, and may not be able to estimate other ratings so as to fill missing ratings for forming the necessary complete multidimensional data. In addition, the conventional recommendations systems and processes did not integrate the functionality of the OLAP-capable system therein, and thus could not generate versatile recommendations and/or suggestion.

C. Profiling Capabilities (Block 420)

Early recommendation systems, (as described in P. Resnick, et al., "GroupLens: An Open Architecture for Collaborative Filtering of Netnews, Proceedings of the 1994 Computer Supported Cooperative Work Conference, 1994) operated on a two-dimensional matrix of ratings, and provided limited profiling capabilities. The reason for this deficiency is due to the fact that the unknown rating estimations were based only on known ratings, and neither the user nor item profiles have been used for this purpose. Subsequent techniques used in the conventional recommendation systems used certain profiling capabilities. For example, the Pazzani Publication describes how to utilize certain demographic information of the users in the collaborative setting. Also, the Mooney Publication described a content-based approach which utilized keyword-based item profiles. Furthermore, the Ansari Publication describes a hybrid approach to rating estimation that uses limited profiling information about both the users and the items.

Figure 6:
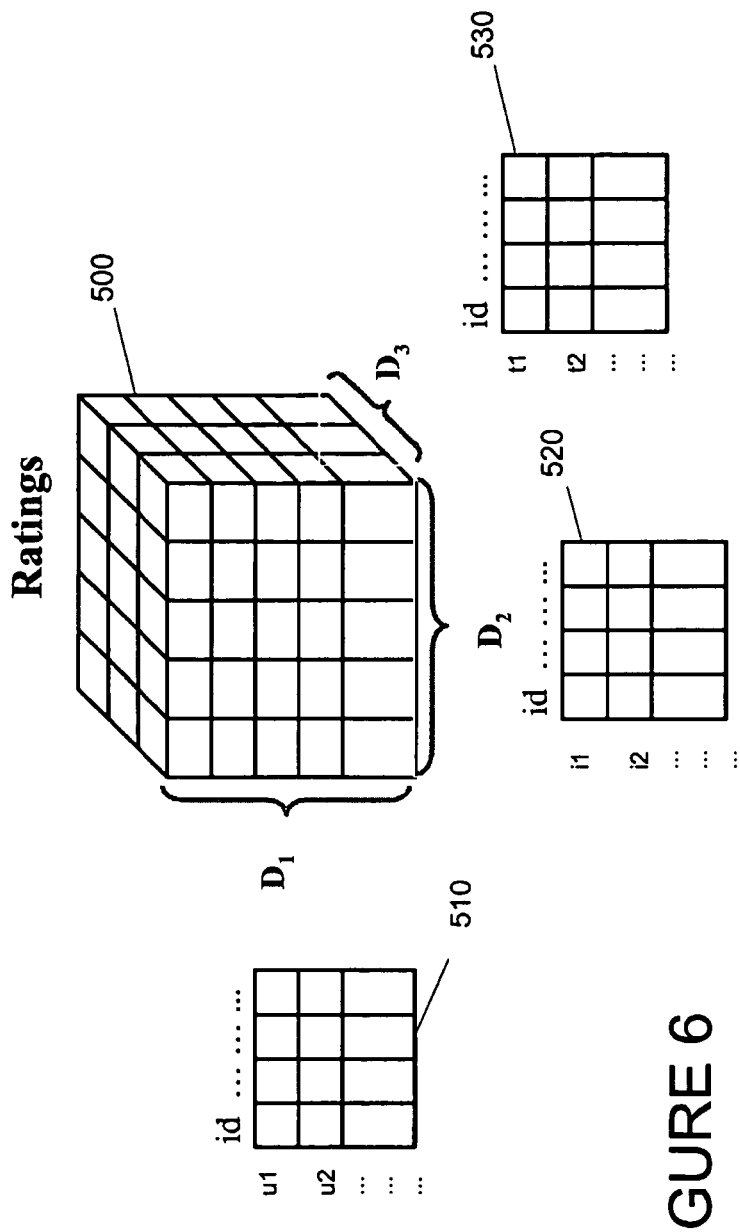
FIG. 6 is an exemplary illustration of a recommendation warehouse which includes data being filled and utilized by the multidimensional recommendation system via the processing arrangement of FIG. 2.

According to the present invention, the profiling capabilities of the recommendation system, process and software arrangement can be significantly expanded. In particular, a recommendation warehouse consisting of multidimensional (i.e., more than two dimensions) cubes can be utilized for storing the ratings, as well as recording comprehensive profiles representing elements of each dimension therein. FIG. 6 shows an exemplary illustration of the recommendation warehouse 500 which includes data that may be filled and utilized by the multidimensional system and process that is executed by the processing arrangement 50. These profiles may contain a set of various attributes describing each dimension. For example, for the "user" dimension 510, the profile may include attributes such as the name, address and phone number of each user, as well as the user's preferences (e.g., his/her favorite food) and behavioral characteristics (e.g., the largest purchase made at a Web site). Similarly, for a "Web content" dimension 520, the profile may include information about the Web content type (e.g., politics, finance, weather, sports, science), the length of the content item (e.g., how long is the news article) and the presence or absence of the important keywords in the content item. One or more additional dimensions 530 can be utilized for the recommendation warehouse 500 according to the present invention. Such profiles can be stored as records in relational tables, one record for each profile and a separate table for each dimension. Examples of the dimensions can be provided as follows:

Dimension 510=Users(User ID, Name, Address, Tel., Date of Birth, Occupation)

Dimension 520=Items(Item ID, Name, Category, Price, Size, . . . )

Dimension 530=Time(Timestamp, Day, Week, Month, Year)

The profiles described above allow the recommendation system, process and software arrangement to generate complex recommendations. Instead of providing standard recommendation of, e.g., "top N items to a user", the present invention makes it possible to utilize the available profiling information so as to provide more targeted recommendations, such as recommending "top 3 action movies with either Sylvester Stallone or Arnold Schwarzenegger that were released within last 5 years." Each dimension may have a static simple profile (e.g., demographic information regarding the user, integers, floating point numbers, strings, etc.) or a complex profile (e.g., sets of rules, sequences, etc. —"John Doe rents action movies only on weekends"). U.S. Pat. No. 6,236,978 issued to Tuzhilin describes examples of rules, profiling techniques and profiles which can be used with the system, process's and software arrangement of the present invention. Thus, it is conceivable, according to the present invention, to utilized extensive profiles, such as, e.g.:

Set of keywords including "most important" words in the documents (see Pazzani Publication);

Set of rules capturing behavior characteristics of customers as described above (e.g., John Doe rents action movies only on Thursday—Name="John Doe", MoveType=action, TimeOfWeek=weekend);

Set of sequences, including sequences of Web browsing activities (e.g., "Jim usually comes to a particular Web site through page X, then visits page Y, the page Z, and then exits the Web site; sequences of user keystrokes and/or mouse clicks"); and Set of signatures (e.g., data structures that are used to capture the evolving behavior learned from large data streams of simple transactions).

Figure 7:
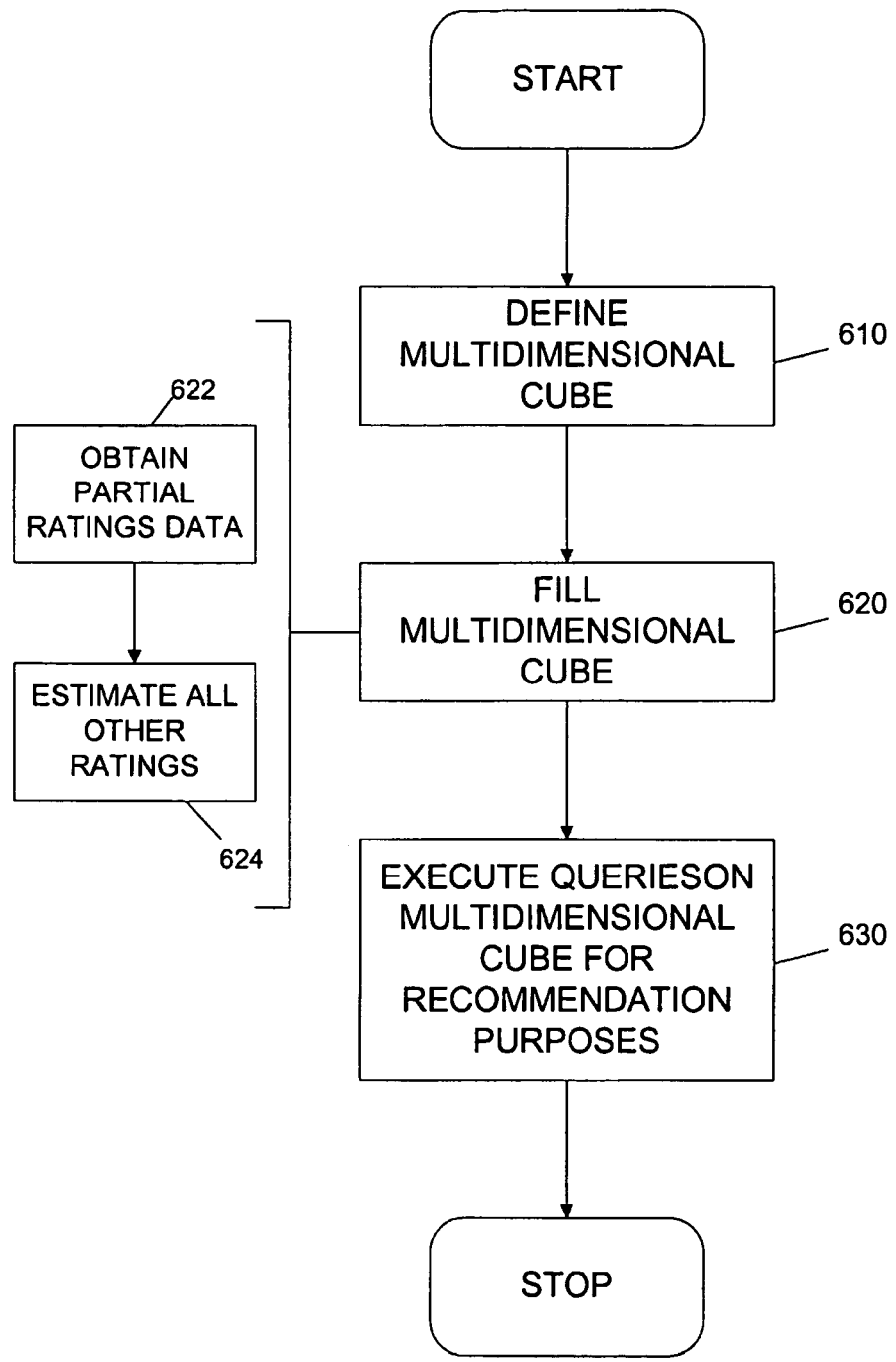
FIG. 7 is a flow diagram of an exemplary embodiment of a process for establishing multiple dimension recommendations/suggestions.

FIG. 7 shows a flow diagram of an exemplary embodiment of a process for establishing multiple dimension recommendations/suggestions. In particular, the multidimensional cube 500 can be defined in step 610. Then, in step 620, this multidimensional cube 500 can be filled with rating, for example. According to one exemplary technique of the present invention, this can be achieved by first obtaining partial ratings data in substep 622 explicitly from the users or implicitly by observing user's behavior, and estimating all other ratings in the multidimensional cube 500 in substep 624 using various estimation methods, such as the ones described herein above (e.g., see equation (2)). Thereafter, a query can be issued against the multidimensional cube 500 for the recommendation purposes. As shall be described in further detail below, the query can use the RQL format. Alternatively, as shall be described below, instead of first completely filling the cube with the ratings (i.e., so that all the cells are filled) and then processing queries against the completely filled cube, it is possible to initially provide queries against the multidimensional cube 500, then determine which portions of the cube 500 need to be filled so as to generate results for a particular query, and thereafter proceed with the rating computation task.

Figure 8:
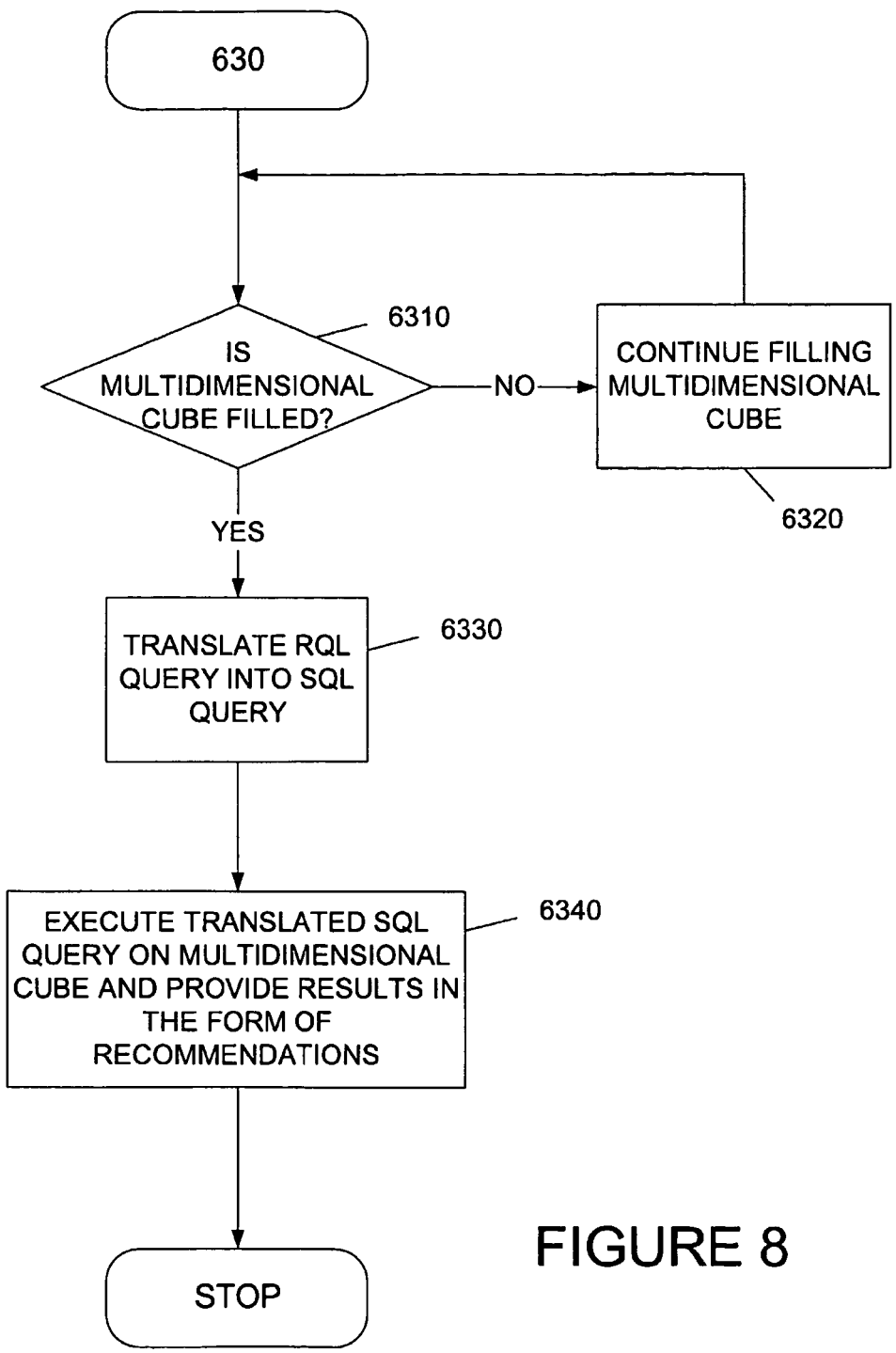
FIG. 8 is a flow diagram of a first exemplary embodiment of a query generation procedure of the process shown in FIG. 7 according to the present invention.

FIG. 8 illustrates the details of a flow diagram of a first exemplary embodiment of a query evaluation step 630 which executes queries on the multidimensional cube 500 for recommendation purposes of the process shown in FIG. 7 according to the present invention. In particular, it is first determined if the multidimensional cube 50 has been filled (step 6310). If not, in step 6320, the filling of ratings into the multidimensional cube 500 is continued to be filled until it is finally completely filled. Otherwise, when the multidimensional cube 500 is completely or adequately filled with ratings and/or recommendations, the RQL query is translated into the SQL query in step 6330. Thereafter, in step 6340, the translated SQL query is applied on the multidimensional cube 500, and the results are provided to the individual entity 10, the business entity 20 and/or the external applications 30 in the form of recommendations. Further description of the RQL queries, and their translation into the SQL queries shall be discussed in further detail below.

Figure 9:
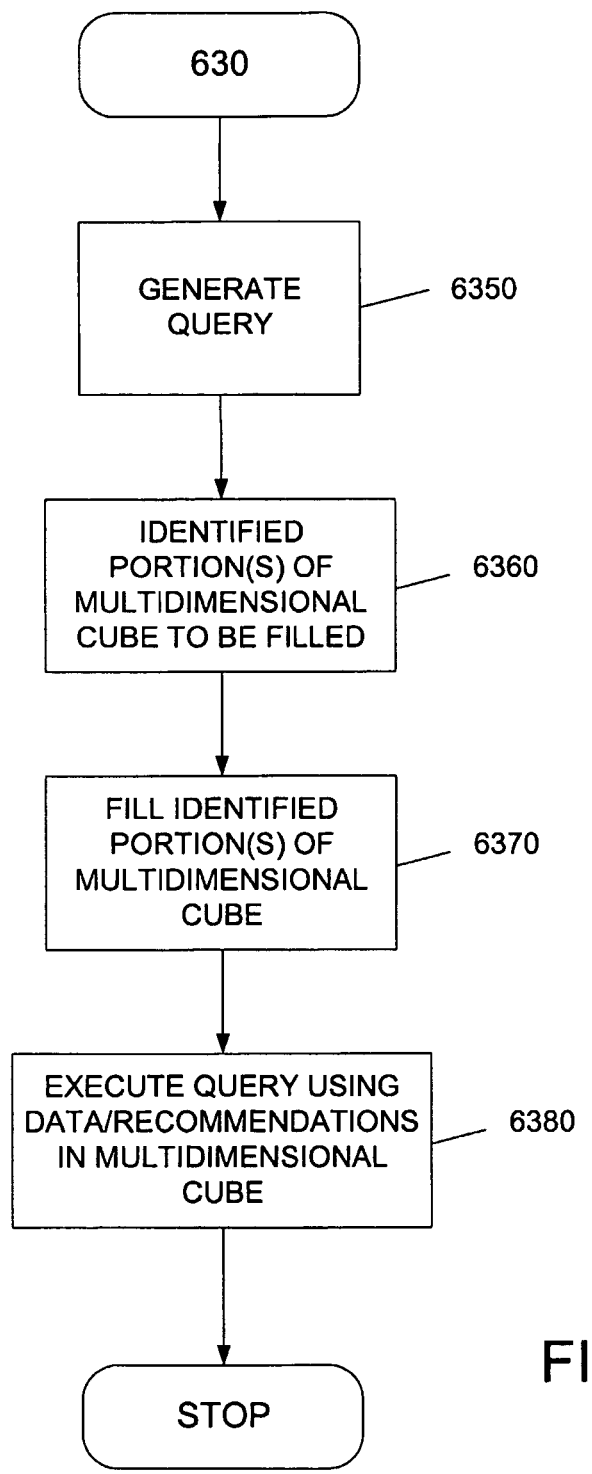
FIG. 9 is a flow diagram of a second exemplary embodiment of the query generation procedure of the process shown in FIG. 7 according to the present invention.

A second exemplary alternative embodiment of the query generation step 630 of the process shown in FIG. 7 according to the present invention is illustrated in FIG. 9. In this embodiment, a query can be generated in step 6350. Then, in step 6360, one or more portions of the multidimensional cube 500 to be filled are identified, and, in step 6370, the identified portions of the multidimensional cube are then filled. Further, the query is executed using the data and/or recommendations stored in the multidimensional cube 500. Exemplary implementation details are described below in Section V.

D. Aggregation Capabilities (Block 420—OLAP)

While OLAP-like aggregation capabilities have been used in certain conventional e-commerce applications, including the storage and analysis of Web usage data (as described in A. Buchner et al., "Discovering Internet Marketing Intelligence through Online Analytical Web Usage Mining," SIGMOD Record, 27(4):54-61, 1998, and J. Srivastava et al., "Web Usage Mining: Discovery and Applications of Usage Patterns from Web Data," SIGKDD Explorations, 1(2):12-23, 2000), these capabilities have not been previously utilized in the recommendation systems and processes. The system and process according to the present invention takes conventional OLAP methods, and extends them to the recommendation model by, e.g., utilizing idiosyncrasies of the recommendation problem, and of the rating estimation methods. Indeed, various dimensions may have hierarchies associated with them so that they can be appropriately utilized for the present invention. For example, a products dimension may include standard industrial product hierarchy, and time dimension generally has a temporal hierarchy (e.g., minutes, hours, days, months, seasons, etc.).

Utilizing the above-referenced hierarchies, the recommendation system, process and software arrangement according to the present invention can provide more complex and detailed recommendations which deal not only with individual items, but also with groups or sets of items. For example, it may be preferable to determine not only how the users enjoy individual movies, e.g., $R_{movie}$(John Doe, Gladiator)=7, but also how they may appreciate certain categories of movies, e.g., $R_{movie}$(John Doe, action_movies)=5. In addition, it may be preferable to also group the users and other dimensions. For example, it may be desirable to know to what extent graduate students like "Gladiator", e.g., $R_{movie}$(graduate_students, Gladiator)=9.

Figure 10:
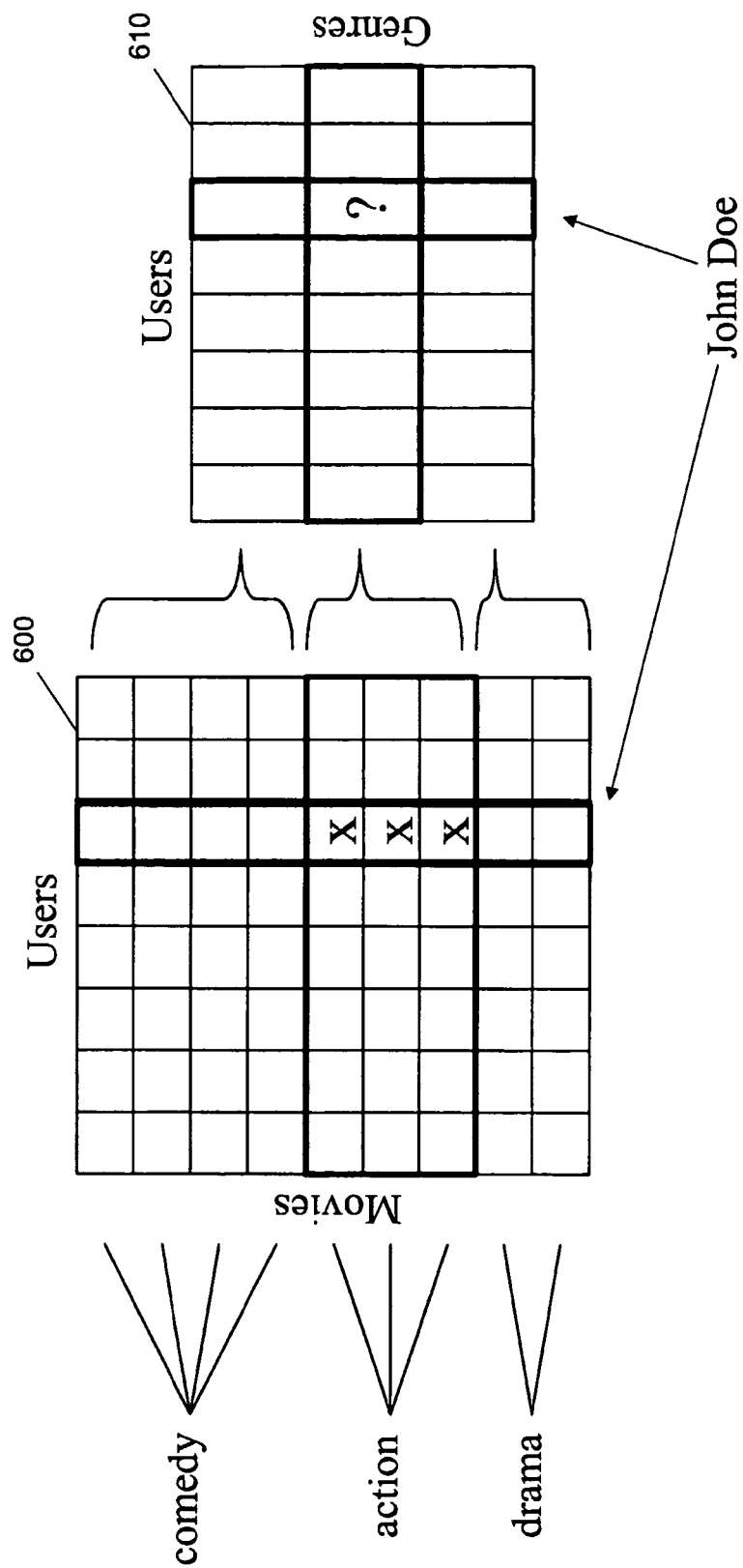
FIG. 10 is an exemplary computational diagram providing sample aggregation functions which can be performed by the system and process of the present invention.

In general, with the individual ratings in the multidimensional cube 500 (as shown in FIG. 6), it may be preferable to utilize the hierarchies to compute aggregated ratings by knowing how the movies can be grouped based on their genres, and it is known how John Doe likes each action movie individually. Particularly, FIG. 10 shows an exemplary computational diagram of which provides sample aggregation functions which can be performed by the system, process and software arrangement of the present invention (i.e., using the processing arrangement 50). With the initial diagram 600 of FIG. 10, it is possible to determine, e.g., an overall rating of how John Doe likes action movies as a genre by aggregating his individual action movie ratings using the final aggregate diagram 610. This can be achieved with the following function:

$$R_{movie}(\text{John Doe,action}) := \text{AGGR}_{x.genre=action} R_{movie}(\text{John Doe},x) \quad (3)$$

The conventional OLAP systems generally generate the aggregation using a simple summation function for all underlying elements. Such approach, however, is not applicable to the recommendation systems and processes because the ratings usually are not additive by nature. Therefore, according to one exemplary embodiment of the present invention, it is preferable to aggregate the ratings by utilizing various other functions such as AVG, MAX, MIN, and AVG-of-TOP-k. For example, the cumulative rating of action movies can be computed for John Doe as follows:

$$R_{movie}(\text{John Doe,action}) := \text{AVG}_{x.genre=action} R_{movie}(\text{John Doe},x) \quad (4)$$

In this manner, the aggregation-based technique according to the present invention as described herein above allows a generation of more complex recommendations that facilitate recommending groups of items, users, and elements of other dimensions.

E. Ratings Estimation

The following is a description of an exemplary embodiment of an estimation of unknown ratings for a recommendation system, process and software arrangement in a multidimensional recommendation space.

More specifically, the rating function R in the equation (3) can initially be defined as a partial function on the recommendation space S, where domain Dom(R)=H ⊂ S which can be defined by explicit ratings specified by the users, or obtained implicitly using various proxies to user ratings. (See A. Caglayan et al., "Learn Sesame—a Learning Agent Engine," Applied Artificial Intelligence, 11:393-412, 1997; J. A. Konstan et al. "GroupLens: Applying Collaborative Filtering to Usenet News," Communications of the ACM, 40(3):77-87, 1997; and D. W. Oard et al., "Implicit Feedback for Recommender Systems," Recommender Systems. Papers from 1998 Workshop. Technical Report WS-98-08. AAAI Press, 1998). One of the challenges of the multidimensional systems and processes is the extrapolation of the rating function from the initial (partial) domain H to the whole recommendation space S, i.e., the estimation of $R(x_1, \ldots, x_n)$ for the points $(x_1, \ldots, x_n) \in S-H$ based on the initial recommendation ratings R as defined on domain H.

In particular, the technique described in the Ansari Publication combines the information regarding the users and the items into a single hierarchical regression-based Bayesian preference model that uses Markov chain Monte Carlo techniques for exact estimation and prediction. In particular, this Bayesian preference model allows a statistical integration of the following types of information useful for making recommendations of items to users: a person's expressed preferences (e.g., ratings), preferences of other, consumers, expert evaluations, item characteristics, and characteristics of individuals. For example, in case of recommending movies, this information may include known movie ratings, gender and age of users, movie genres, movie reviews by critics. This technique of the present invention can be extended to combine information about more than two dimensions by allowing the regressions to include additional variables that describe certain characteristics of other dimensions, and not only the items and users.

It should be understood that in addition to or instead of the above-described rating estimation techniques (which can be used in the process according to the present invention shown in FIG. 7—step 624), other estimation techniques can also be utilized. Indeed, the domain expert may select a specific rating estimation function that is most suitable for the application at hand. This is achieved in our model by providing the DEFINE ESTIMATOR and the ESTIMATE commands as a part of the data definition component of the Recommendation Query Language ("RQL") as shall be discussed in further detail below. These commands can preferably be specified by the user, e.g., a system administrator, and define a particular rating estimation function for an application at hand (e.g., DEFINE ESTIMATOR command) as well as compute actual ratings (ESTIMATE command).

III. Relational Database Management System

Figure 11:
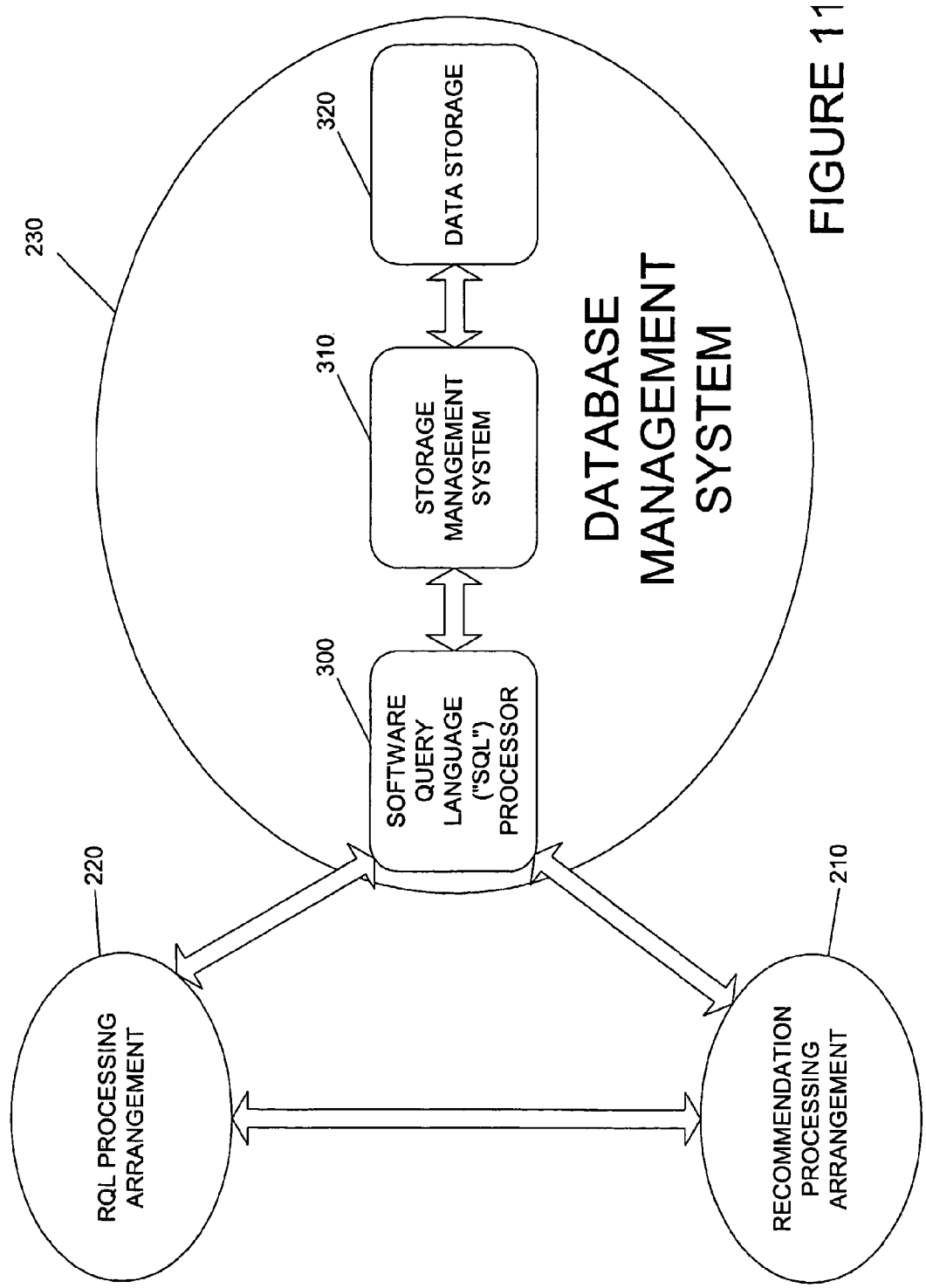
FIG. 11 is an exemplary embodiment of a relational database management system of the processing arrangement shown in FIG. 3.

FIG. 11 illustrates further details of the relational database management system ("RDMS") 230 of the processing arrangement 230. In particular, the RDMS 230 may include a structured query language ("SQL") processor 300 (e.g., executed by the processing device 120) which receives the RQL queries from the RQL processing arrangement 210 of FIG. 4, and the data from the recommendation processing arrangement 210. Upon the receipt of the RQL query, the SQL processor 300 translates it into an SQL query, and forwards it to a storage management system 310. The storage management system 310 may be controlled by the processing device 120 and/or the data storage arrangement 60. Thereafter, the data management system 310 can forward the query to the data storage 320 (e.g., the storage device 150 and/or the data storage arrangement 60) to be recorded thereon. Another function of the SQL processor 300 is to obtain the data from the data storage 320, via the storage management system, by executing the SQL query translated from the RQL query, and forward the results of the query to the recommendation processing arrangement 210 which then forwards the data to the individuals 10, business entities 20, external applications 30, web arrangements 45 and/or other systems.

IV. Recommendation Query Language ("RQL")

As discussed above, the types of recommendations may need to be expressed directly by the users (such as customers and business analysts) and/or by various e-commerce systems (e.g., shopping robots, etc.), rather than being "hard-wired" into the recommendation system directly by the vendor. Thus, a flexible query language such as RQL, would allow the users to express the recommendations in a manner similar to the SQL would allows database queries to be expressed.

A. Data Definition Language

The purpose of the data definition language of the RQL is to define various components of the recommendation warehouse, such as dimensions, cubes, and rating estimation methods. Dimensions of the recommendation warehouse, such as User, Product, and Time, can be defined in the RQL with a DEFINE DIMENSION command. Also, the RQL command DEFINE CUBE can be used for defining multidimensional cubes of ratings. These commands are similar to the data cube definition commands in traditional data warehousing/OLAP languages.

Example 1

The warehouse for a movie recommendation application, consisting of two dimensions and a cube of ratings:

| | |
|---|---|
| DEFINE DIMENSION | User ( UserId, LastName, FirstName, Gender, Age, MaritalStatus ) |
| DEFINE DIMENSION | Movie ( MovieId, Title, Genre, Length, Director, Year ) |
| DEFINE CUBE | MovieRecommender ( User, Movie ) WITH MEASURES ( Rating ) |

It should be noted that each dimension can be represented by a different name, and described using a list of attributes characterizing each element of the dimension. That is, each element of a dimension can be represented by a profile, as described in more detail below. The data cube can be defined by a DEFINE CUBE command that utilizes previously defined dimensions (User and Movie in the above example), and uses the Rating measure specified with the WITH MEASURES clause. Although most traditional recommendation systems use a single measure, multiple measures can also be used according to the present invention, as shall be described below. Indeed, multiple recommendation criteria may be desired in certain applications, such as recommending a restaurant. For example, a popular restaurant guide rates restaurants according to four criteria: food, decor, service, and cost.

Example 2

The following is an example of the data warehouse for a vacation recommendation system that may be described with more than two dimensions:

| | |
|---|---|
| DEFINE DIMENSION | Customer ( CustId, LastName, FirstName, Gender, Age, MaritalStatus ) |
| DEFINE DIMENSION | Vacation ( VacationId, Destination, Length, Price ) |
| DEFINE DIMENSION | Time ( TimeId, Month, Season ) |
| DEFINE CUBE | VacationRecommender ( Customer, Vacation, Time) WITH MEASURES (Rating, Profit ) |

The DEFINE DIMENSION and DEFINE CUBE commands specify the structure of the recommendation warehouse. In addition, it is preferable to populate the recommendation warehouse with the recommendation ratings. Therefore, the recommendation warehouse should preferably support various rating insertion and estimation methods. User-specified ratings are inserted into the warehouse using INSERT and LOAD commands. Functions for estimating the unknown ratings based on the initial user-specified ratings are defined with the command:

DEFINE ESTIMATOR estimator_name AS module_name where estimator_name is the name of the rating estimation function defined by this statement, and module_name denotes a software module (e.g., a program file) that computes this function. In addition, RQL may provide the ESTIMATE command as follows:

ESTIMATE measure_name IN cube_name USING estimator_name which can compute the unknown values for the measure measure_name in the cube cube_name using the estimation function estimator_name previously defined with the DEFINE ESTIMATOR command.

Figure 12:
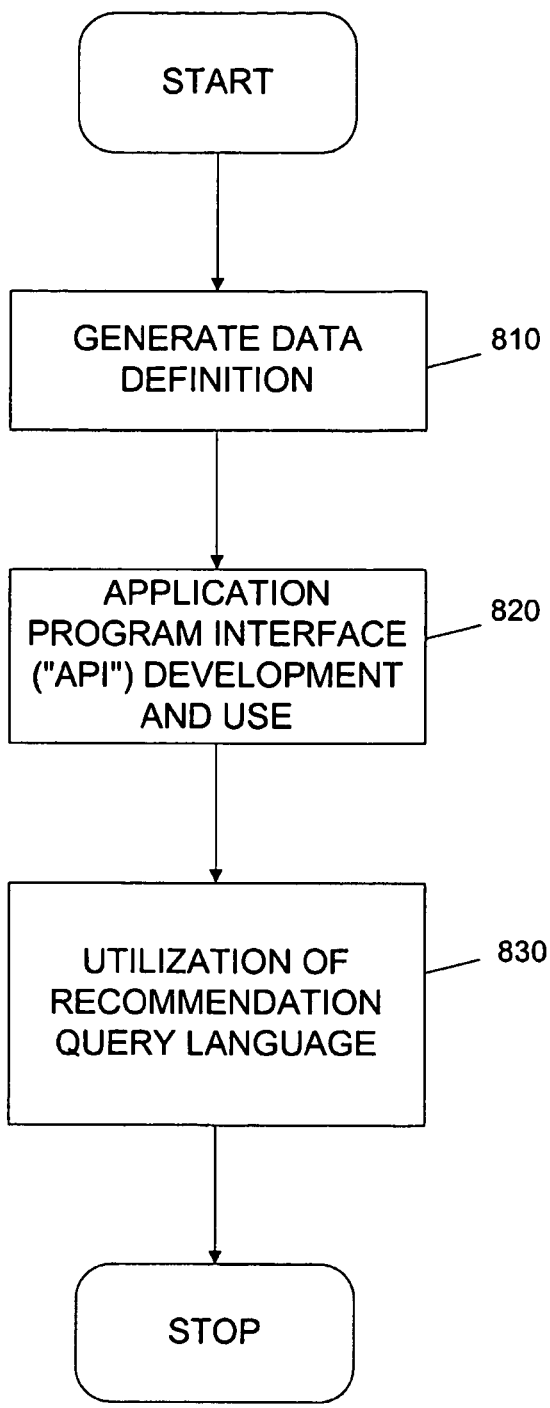
FIG. 12 is an exemplary flow diagram of a sample implementation of the system and process according to the present invention.

FIG. 12 illustrates an exemplary embodiment of the process according to the present invention which can use a program interface, as well as provide for the development of such program interface after the data is defined. First, in step 810, the user or the processing arrangement 50 manually or authentically define the data (as described above). Then, the application program interface ("API") can be developed and/or used based on the defined data and its characteristics in step 820. Thereafter, in step 830, the RQL may be utilized to obtain the recommendations using the queries of the RQL from the relational database management system 220 (e.g., extracted from the data storage arrangement 60 and/or the storage device 150).

B. Querying Capabilities

Recommendation queries are preferably expressed in RQL with the RECOMMEND command. The query examples below to provide recommendations are based on the recommendation warehouses defined above in Examples 1 and 2. Example 1 shows the "standard" type of recommendation supported by most of the current recommendation systems.

Query 1

Recommend top 5 yet unseen movies to each user:

| | |
|---|---|
| RECOMMEND | Movie TO User BASED ON Rating |
| | SHOW TOP 5 |
| FROM | MovieRecommender |

This query retrieves all estimated (i.e., new) user/movie ratings from cube MovieRecommender specified in the FROM clause, groups them by the user, and returns 5 highest-ranked movies for each user, as specified by the SHOW subclause. The BASED ON subclause specifies that the Rating measure should be used to rank movies.

It should be noted that the above query can be modified so as to recommend users to movies, instead of movies to users. The next example illustrates certain selection capabilities of the RQL.

Query 2

For each user who is from New York, recommend the top 3 movies, including the previously seen ones, that are longer than two hours:

| | |
|---|---|
| RECOMMEND | Movie TO User BASED ON Rating |
| | USING ALL |
| | SHOW TOP 3 |
| FROM | MovieRecommender |
| WHERE | Movie.Length > 120 AND User.City = 'New York' |

Instead of retrieving ratings from the entire MovieRecommender cube, it is preferable to utilize the WHERE clause to restrict the results to only include those movies that are longer than 2 hours (i.e., 120 minutes) and only those users who are from New York. Also, the "ALL" keyword in the USING subclause specifies that all ratings from such restricted cube should be taken into consideration. If the USING subclause would be omitted, only the estimated (i.e., new) ratings would be used when retrieving recommendations by default.

The next example illustrates the support of multiple measures in the RQL, as well as the restrictions of the measure values.

Query 3

Recommend to each user the top three most profitable vacations which are also highly rated (the rating of at least 8):

| | |
|---|---|
| RECOMMEND | Vacation, Time TO User BASED ON Profit |
| | SHOW TOP 3 |
| | WITH Rating ≥ 8 |
| FROM | VacationRecommender |

In this example, both measures defined in VacationRecommender cube (as described above in Example 2) are utilized. "Rating" is used in the WITH subclause to include only vacations that are highly rated (i.e., having a rating that is greater than or equal to 8), and "Profit" is used to rank the alternatives before returning the results.

The next example describes the aggregation capabilities of the RQL, and illustrates additional selection capabilities.

Query 4

Recommend movie genres to each user that has previously seen "Gladiator", but only if the rating for this genre is above 8:

| | |
|---|---|
| RECOMMEND | Movie AGGR BY Genre TO User BASED ON |
| | AVG(Rating) |
| | WITH AVG(Rating) > 8 |
| FROM | MovieRecommender |
| WHERE | User HAS (Movie.Title = 'Gladiator') |

The AGGR BY keyword specifies that movie genres should be recommended, rather than the individual movies. Also, the AVG (average) function is used in this query to aggregate and rank the ratings. Further, the aggregate ratings can be restricted so that only the ratings that are greater than 8 are considered. The HAS operator allows to specify the restrictions based on what the users have previously done. In particular, "User HAS (Movie.Title='Gladiator')" statement restricts the set of all users to include only the user who have seen the movie "Gladiator." Also, it should be noted that the SHOW subclause is not utilized in the above exemplary query to include only top k movie genres for each user. Therefore, this query retrieves all genres that satisfy all its restrictions.

In general, the syntax of the RECOMMEND statement is preferably as follows:

| | | |
|---|---|---|
| RECOMMEND | dimension__list__1 | |
| | TO dimension__list__2 | |
| | BASED ON rank__measure | |
| | USING measure__type__restrictions | // optional |
| | SHOW measure__rank__restrictions | // optional |
| | WITH measure__value__restrictions | // optional |
| FROM | cube__name | |
| WHERE | dimension__restrictions | // optional |

The semantics of the RECOMMEND statement is as follows. First, the cube cube_name specified in the FROM clause is restricted using dimension_restrictions from the WHERE clause. The WHERE clause is optional. The resulting sub-cube is then processed by the RECOMMEND clause. The dimension_list_1 argument specifies the dimensions that should be recommended, whereas dimension_list_2 specifies the dimensions that should receive the recommendations. These two dimension lists should preferably be disjoint. Also, any dimension in these lists can be "aggregated" based on some of its attributes, as illustrated in Query 4. The BASED ON subclause specifies the measure by which recommendations are to be ranked. The USING, SHOW and WITH subclauses allow various restrictions to be placed on the measures prior to returning the recommendation query results, as illustrated in exemplary Queries 1-4.

The preferred embodiment of the system, process and software arrangement which execute the RQL queries enable the RECOMMEND statement to return the recommendations to the end-user. In addition, as described above, it may be preferable to record the recommendation results in the recommendation warehouse as a new cube that can be subsequently queried. It is possible to perform this task using the SAVE CUBE statement. For example, the sub-cube from Query 2, i.e., containing only ratings of how the users from New York like long movies, can be saved as follows:

| | |
|---|---|
| SAVE CUBE | User, Movie WITH Rating |
| FROM | MovieRecommender |
| WHERE | Movie.Length > 120 AND User.City = 'New York' |
| INTO | LongMoviesForNewYorkers | where the INTO clause specifies the name under which the new cube is saved in the recommendation warehouse. The SAVE CUBE clause specifies a subset of dimensions from cube MovieRecommender that the new cube is to have. Similarly, the WITH clause specifies a subset of measures from cube MovieRecommender that the new cube is to contain. The FROM and WHERE clauses in the SAVE CUBE statement preferably have the same syntax as the ones of the RECOMMEND statement.

In another embodiment of the present invention, the above-described RQL can be used either directly by the "power-users" or as a query language embedded in general programming languages. It is preferable to utilize various GUI-based tools (e.g., Visual Basic, etc.) to allow the unsophisticated end-users to express their queries using intuitive graphical means and display generated thereby.

V. System, Process and Software Arrangement Utilizing Multidimensional Data

With the use of the OLAP systems, the multidimensional recommendation model can be implemented in the following manner. The proprietary data structures for cube storage and RQL query processing techniques (the details of which are described above) can be supported. Alternatively, the multidimensional recommendation model can be implemented via the relational data model and the SQL. The main differences of implementing the proprietary (e.g., RQL) techniques for the data storage and operations as opposed to the use of the existing database technologies and languages (e.g., SQL) are the high efficiency and performance of the proprietary model and the extensibility, as opposed to openness and standardization of the existing database techniques and languages model. (See S. Chaudhuri et al., "An Overview of Data Warehousing and OLAP Technology," ACM SIGMOD Record, 26(1):65-74, 1997; and A. Shoshani, "OLAP and Statistical Databases: Similarities and Differences," Proceedings of the Sixteenth ACM SIGACT-SIGMOD-SIGART Symposium on Principles of Database Systems, 1997, pp. 185-196).

In one exemplary embodiment of the present invention, it is possible to map a multidimensional recommendation model into the relational data model, and convert the queries of the RQL into the corresponding syntax of the SQL. This exemplary implementation allows the system, process and software arrangement according to the present invention to be easily integrated with the existing relational database management systems. Thus, it is possible to map the multidimensional data model of the present invention into a specific relational design called the "star schema". Each dimension thereof can represented by a single relational table which consists of columns that correspond to attributes of the dimension. Individual records in such table may represent the profiles of the elements of the dimension (e.g., user profiles, content profiles). The multidimensional cube of ratings can be represented by a single fact table, where each record represents an "entry" in the multidimensional cube, i.e., a record in the fact table contains pointers (or foreign keys) to the corresponding element of each dimension Accordingly, turning back to the high-level functional and architectural diagram of performance capabilities which are able to be performed by the processing arrangement of FIG. 3, in order to query the resulting relational data model, the RQL processing arrangement 220 translates the RQL queries into the corresponding SQL queries, and executes the translated SQL query to obtain the requested data from the relational database. The results of SQL queries are then processed by the recommendation processing arrangement 210 and/or the processing arrangement 50, and possibly returned to the user. It should be note that the RQL allows the recommendation queries to be expressed at a higher level of abstraction than the SQL, and provides for a separation between the practical and conceptual aspects of the recommendation systems. For example, considering Query 4 which is expressed in the RQL, the translated SQL version of this query would be the following:

| | |
|---|---|
| SELECT | UserId, Genre, AVG(Rating) |
| FROM | MovieRecommender R, Movie M |
| WHERE | R.MovieId = M.MovieId AND |
| | R.RatingType = 'ESTIMATED' AND |
| | R.UserId IN ( SELECT DISTINCT UserId |
| |     FROM MovieRecommender RR, Movie MM |
| |     WHERE RR.MovieId = MM.MovieId AND |
| |     MM.Title = 'Gladiator' AND |
| |     RR.RatingType = 'KNOWN' ) |
| GROUP BY | UserId, Genre |
| HAVING | AVG(Rating) ≥ 8 |
| ORDER BY | UserId, AVG(Rating), Genre |

For example, the WHERE clause of the RQL query is mapped into the SQL's WHERE statement. As illustrated above, the use of the RQL is significantly easier to implement (i.e., as opposed to the SQL) for generating queries using multidimensional recommendation systems, processes and software arrangements to provide recommendations to the users, at least because the RQL allows the multidimensional recommendation data to be easily manipulated.

Also provided is a description of a technique which facilitates a determination of which ratings are to be computed for a given query. The ratings for the recommendation cube can be computed "on-the-fly" or dynamically. In particular, given a particular RQL query, the system, process and software arrangement according to the present invention can determine which portions of the multidimensional recommendation cube are needed to generate the results for the query. Then, the ratings can be computed for such portion of the multidimensional recommendation cube after the query is issued. One exemplary technique to determine which portions of the multidimensional recommendation cube are needed is provided as follows.

Similarly to the description above, the WHERE clause of the RQL query is mapped into the SQL's WHERE statement.

The constraints of the WHERE clause determine the dimensions of the recommendation sub-cube in substantially the same manner as is the case for the multidimensional query languages and cubes (e.g. as Microsoft's MDX OLAP extensions to SQL, or as Microstrategy's ROLAP tool evaluates constraints on the star schema using pure SQL queries). Ratings for the resulting sub-cube are calculated in substantially the same manner as for the main sub-cube; however, the number of ratings to be calculated can be significantly smaller for the sub-cube.

One having ordinary skill in the art would clearly recognize that many other applications of the embodiments of the system and process for handwriting recognition according to the present invention. Indeed, the present invention is in no way limited to the exemplary applications and embodiments thereof described above.

The invention claimed is:

1. A method comprising:
receiving, at one or more computer servers, a first query, the syntax of the first query being based on a recommendation-specific language corresponding to a multidimensional recommendation model, wherein the recommendation-specific language further includes commands associated with a data definition language for specifying a multidimensional space, including specification of each dimension of the multidimensional space and elements of each dimension, and wherein the multidimensional space includes at least three dimensions;
defining the multidimensional space using the data definition language, the defining comprising defining the dimensions of the multidimensional space and defining elements of each dimension of the multidimensional space;
translating, by one or more processors associated with the one or more computer servers, the first query into a second query, the syntax of the second query being based on a structured query language including commands to retrieve information stored according to a relational data model, wherein the translating is based on a mapping between the multidimensional recommendation model and the relational data model;
retrieving, by the one or more processors, information from the multidimensional space based on the second query;
generating, by the one or more processors, at least one recommendation based on the retrieved information, wherein the at least one recommendation includes at least one multidimensional suggestion; and
providing, by the one or more processors, the at least one recommendation in response to the first query.

2. The method of claim 1, wherein the recommendation-specific language comprises a query syntax for retrieving recommendations for a specified user.

3. The method of claim 1, wherein the recommendation-specific language comprises a query syntax for retrieving recommendations for a group of users.

4. The method of claim 1, wherein the at least one recommendation is for one or more pieces of information, one or more products, one or more services, or any combination thereof.

5. The method of claim 1, wherein the recommendation-specific language comprises a query syntax for retrieving recommendations based on a ranking.

6. The method of claim 1, wherein the recommendation-specific language comprises a query syntax for restricting recommendation results based on at least one element of at least one dimension of the multidimensional space.

7. The method of claim 1, wherein the recommendation-specific language comprises a query syntax for aggregating recommendation results based on at least one element of at least one dimension of the multidimensional space.

8. The method of claim 1, wherein receiving the first query comprises receiving information in accordance with an application programming interface.

9. The method of claim 1, wherein receiving the first query comprises receiving information provided using a graphical user interface.

10. The method of claim 1, wherein the recommendation-specific language is compatible with an OLAP-based system.

11. The method of claim 1, wherein each dimension having one or more attributes characterizing each element of the dimension.

12. The method of claim 1, wherein the at least one multidimensional suggestion is based on the at least three dimensions.

13. A system comprising:
one or more processors; and
a memory coupled to the processors comprising instructions executable by the processors, the processors operable when executing the instructions to:
receive a first query, the syntax of the first query being based on a recommendation-specific language corresponding to a multidimensional recommendation model, wherein the recommendation-specific language further includes commands associated with a data definition language for specifying a multidimensional space, including specification of each dimension of the multidimensional space and elements of each dimension, and wherein the multidimensional space includes at least three dimensions;
define the multidimensional space using the data definition language, the defining comprising defining the dimensions of the multidimensional space and defining elements of each dimension of the multidimensional space;
translate the first query into a second query, the syntax of the second query being based on a structured query language including commands to retrieve information stored according to a relational data model, wherein the translating is based on a mapping between the multidimensional recommendation model and the relational data model;
retrieve information from the multidimensional space based on the second query;
generate at least one recommendation based on the retrieved information, wherein the at least one recommendation includes at least one multidimensional suggestion; and
provide the at least one recommendation in response to the first query.

14. The system of claim 13, the processors being further operable when executing the instructions to receive the first query to receive information in accordance with an application programming interface.

15. The system of claim 13, the processors being further operable when executing the instructions to receive the first query to receive information provided using a graphical user interface.

16. One or more computer-readable non-transitory storage media embodying software that is operable when executed to:
receive, at one or more computer servers, a first query, the syntax of the first query being based on a recommendation-specific language corresponding to a multidimensional recommendation model, wherein the recommendation-specific language further includes commands associated with a data definition language for specifying a multidimensional space, including specification of each dimension of the multidimensional space and elements of each dimension, and wherein the multidimensional space includes at least three dimensions;

defining the multidimensional space using the data definition language, the defining comprising defining the dimensions of the multidimensional space and defining elements of each dimension of the multidimensional space;

translate, by one or more processors associated with the one or more computer servers, the first query into a second query, the syntax of the second query being based on a structured query language including commands to retrieve information stored according to a relational data model, wherein the translating is based on a mapping between the multidimensional recommendation model and the relational data model;

retrieve, by the one or more processors, information from the multidimensional space based on the second query;

generate, by the one or more processors, at least one recommendation based on the retrieved information, wherein the at least one recommendation includes at least one multidimensional suggestion; and provide, by the one or more processors, the at least one recommendation in response to the first query.

17. The media of claim 16, wherein the recommendation-specific language comprises a query syntax for retrieving recommendations based on a ranking.

18. The media of claim 16, wherein the recommendation-specific language comprises a query syntax for restricting recommendation results based on at least one element of at least one dimension of the multidimensional space.

19. The media of claim 16, wherein the recommendation-specific language comprises a query syntax for aggregating recommendation results based on at least one element of at least one dimension of the multidimensional space.

20. The system of claim 13, wherein the at least one recommendation is for one or more pieces of information, one or more products, one or more services, or any combination thereof.

* * * * *